United States Patent [19]

Cherny et al.

[11] Patent Number: 5,112,140
[45] Date of Patent: May 12, 1992

[54] SEAL ASSEMBLY FOR RECIPROCATING MEMBERS

[76] Inventors: Dmitry Cherny; Nicolai Cherny; Dimitry Cherny, all of 159 Apsley Rd, Willetton 6155, W.A., Australia

[21] Appl. No.: 644,018

[22] Filed: Jan. 22, 1991

Related U.S. Application Data

[63] Continuation of Ser. No. 437,830, Nov. 17, 1989, abandoned.

[30] Foreign Application Priority Data

Nov. 17, 1988 [AU] Australia ............................ PJ1522

[51] Int. Cl.$^5$ ............................................. F16C 29/02
[52] U.S. Cl. ......................................... 384/16; 384/38
[58] Field of Search ............... 384/16, 38, 145, 152, 384/209, 208

[56] References Cited

U.S. PATENT DOCUMENTS 2,832,650  4/1958  Park ...................................... 384/16
4,483,569 11/1984  Smith .................................. 384/145
4,729,145  3/1988  Egner-Walter et al. ............... 384/16
4,832,161  5/1989  Weiler et al. ......................... 384/16

Primary Examiner—Lenard A. Footland
Attorney, Agent, or Firm—Banner, Birch, McKie & Beckett

[57] ABSTRACT

A seal assembly for use in establishing a seal between the pump rod of a down the hole pump and the upper end of a bore casing. The seal assembly having a stuffing box supported by a body through which the pump rod extends. The stuffing box being mounted on a guide member having a ball section with the pump rod extending axially therethrough. The ball section being seated in bearings located in a chamber in the body so that the guide member and stuffing box may pivot relative to the body to accommodate angle misalignment of the pump rod. The bearings having freedom for lateral movement in the body chamber to establish axial alignment of the stuffing box with the pump rod.

5 Claims, 2 Drawing Sheets

SEAL ASSEMBLY FOR RECIPROCATING MEMBERS

This application is a continuation of U.S. Pat. application Ser. No. 437,830, filed Nov. 17, 1989, now abandoned.

BACKGROUND OF THE INVENTION

This invention relates to a seal assembly for use in establishing a seal between two members, one of which reciprocates relative to the other. There is a wide range of mechanisms wherein a reciprocating member passes through the wall of a chamber or other fixed structure, and it is required to establish a seal between the chamber or structure and the reciprocating member to prevent leakage therebetween. This construction is commonplace in a wide variety of pumps, wherein a piston reciprocates in a cylinder, including down hole or lift pumps.

In such pumps, it is common to effect the reciprocating movement of the member from a crank or eccentric and thus it is not always possible to achieve pure straight line reciprocating movement. Also non-pure linear reciprocating movement can arise from normal misalignment between components that can arise from manufacturing tolerances, errors in installation, or movement or supports or foundations after installation.

This problem is encountered in pumps known as "hammer head pumps" used extensively in oil fields to pump crude oil from underground reservoirs. These pumps usually operate on a continuous basis and are frequently operated in large numbers in a single oil field. Accordingly, it is desirable to reduce the maintenance requirements of the pump to a minimum.

The existence of non-pure linear movement in such pumps can result in lateral loads on the components of the seal unit provided where the reciprocating member passes through the structure or through a guide. In oil field pumps, the loads on the reciprocating member are quite high having regard to the length thereof, which may be several thousand feet, in addition to the column of oil of similar length. Accordingly, any lateral misalignment develops a substantial side loading of the seal with a resultant high wear rate. It is therefore necessary to provide regular and costly maintenance of the seal or the inconvenience of leakage which may, amongst other things, cause adverse environmental conditions.

It is therefore the object of the present invention to provide a seal assembly for use in conjunction with reciprocating members that is tolerant to misalignment between the movable and stationary members so as to maintain an effective seal under such conditions and to provide a longer effective life.

SUMMARY OF THE INVENTION

With this object in view, there is provided according to the present invention a seal assembly for use in establishing a seal between two members, one of which is a stationary member and the other of which is a reciprocating member adapted to extend through and reciprocates relative to said stantionary member, said seal assembly comprising a mounting base having means thereon for securing it to stationary member, a bearing carrier engaged with the mounting base, the mounting base and the bearing carrier defining a bearing chamber and a passage extending through said mounting base adapted to substantially enclose said reciprocating member during relative movement thereof with respect to said stationary member, a guide member having an axial bore therethrough for alignment with said passage and through which said reciprocating member is adapted to extend, in which the said guide member having a bearing portion at one axial end and a stuffing box unit at the other axial end thereof, said stuffing box unit being arranged to receive packing material to form a seal with said reciprocating member said bearing portion being located in said bearing chamber, said bearing carrier having an oversize bore at an end thereof remote from said mounting base, and said guide member extending through said oversize bore, bearing means located in said bearing chamber and engaging said bearing portion of said guide member, said bearing means permitting angular axial displacement of said guide member with respect to said mounting base and bearing carrier, and said bearing means being relative to the bearing means whereby the stuffing box unit can self-align with the reciprocating member.

Preferably the bearing means comprises two bearing elements, conveniently of a ring, shape mounted in said bearing chamber in spaced relation in the axial direction of the passage therein, said bearing elements having independent transverse movement in said bearing chamber relative to the mounting base and bearing carrier. This allows the guide member and the stuffing box unit to automatically take up a correct concentric position the relative to the reciprocating member or rod passing therethrough. The movement of the guide member and stuffing box unit into correct alignment is effected by the lateral force generated by the reaction of the weight of the rod to misalignment. The movement of the guide member and stuffing box unit thus automatically and instantaneously eliminates any lateral forces on packing material in the stuffing box that would have been caused by any misalignment of the mounting base relative to the reciprocating member or rod that arose during initial assembly or in use.

The bearing portion of said guide member may have an external part-spherical surface. The bearing means may operatively engage said part-spherical surface at least two locations located on opposite sides of a diametral plane of said part-spherical surface. The pair of opposed bearing elements provide a seat for the part-spherical surface of the bearing portion to permit tilting of the stuffing box unit axis relative to the mounting base and bearing carrier.

The above described construction permits the stuffing box unit to move relative to the mounting base while a member is undergoing a reciprocating movement through the mounting base, the guide member and the stuffing box unit. The capacity to allow angular and transverse movements between the stuffing box unit and the mounting base enables the former to maintain axial alignment with the reciprocating member, thereby eliminating lateral loads on the packing material in the stuffing box unit that would otherwise arise due to misalignment between the reciprocating member and the stuffing box unit through which it is moving.

The invention will be more readily understood from the following description of one preferred arrangement of the invention as illustrated in the accompanying drawings.

DESCRIPTION OF A PREFERRED EMBODIMENT OF THE INVENTION

Figure 1:
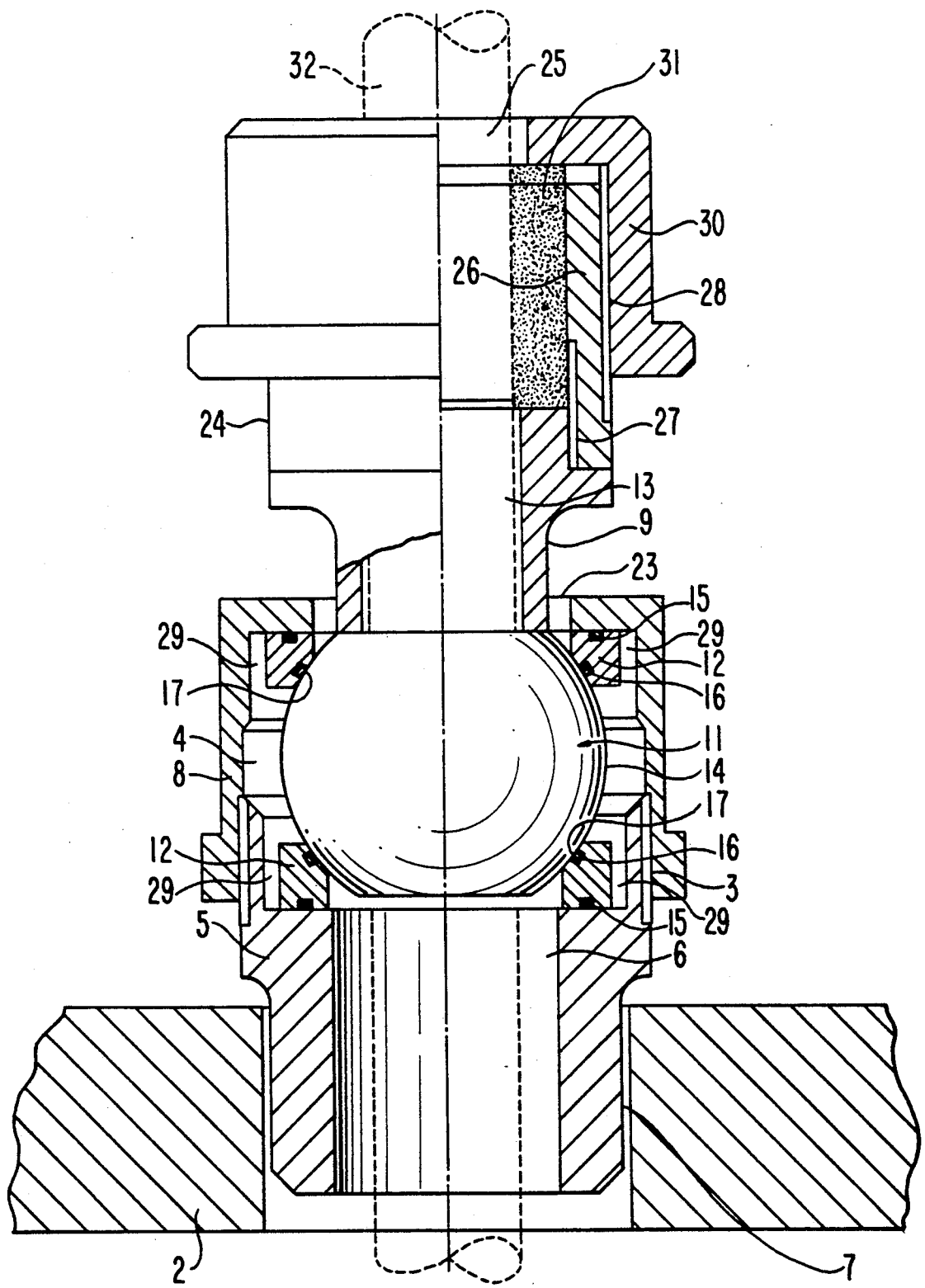
FIG. 1 is a longitudinal sectional view of the seal unit.

Referring now to the drawings, the seal device, particularly designed for use with a down hole pump, comprises principally a mounting base 5 and a bearing carrier 8 which form a generally cylindrical chamber 4. The mounting base 5 is externally threaded at one end to engage with an internally threaded portion of the bearing carrier 8, as indicated at 3, to form the cylindrical bearing chamber 4. The other end of the mounting base 5 has an externally threaded portion 7 that may be secured to a complementary threaded portion attached to an appropriate portion of a member 2 which is predominantly stationary in use, such as part of the bore casing of a down hole pump. A co-axial passage 6 is provided through the mounting base 5, of a diameter to provide working clearance for a reciprocating rod that will pass therethrough in use (as indicated at 32 in broken outline in FIG. 1), plus allowance for lateral and or angular displacement,,due to misalignment of that rod.

There is also provided a guide member 11. The guide member 11 has at one end a bearing portion 14 providing an external part spherical bearing surface, and at the other end an externally threaded flange 27. The bearing portion 14 and the flange 27 are joined by a tubular portion 9 and a co-axial bore 13 extends through the full length of the guide member 11 so the reciprocating rod may extend therethrough.

As indicated above, the bearing carrier 8 and the co-operating threaded portion of the base 5 form the bearing chamber 4 and the bearing portion 14 of the guide member 11 is located within the chamber 4 together with two axially spaced bearing rings 12, each in bearing contact with the external part spherical bearing surface of the bearing portion 14 of the guide member 11. As can be seen in FIG. 1, each bearing ring 12 includes an inner part spherical annular portion 17 which is in engagement with the external part spherical bearing surface of the bearing portion 14. 0-ring seals 15 are provided in each of the bearing rings 12 to co-operate respectively with the base 5 and the bearing carrier 8 to provide a seal therewith. Further 0-ring seals 16 are provided between the respective annular portions 17 of the bearing rings 12 and the part-spherical external surface of the bearing portion 14 of the guide member 11. The bearing rings 12 have radial clearance as indicated at 29 in the chamber 4 formed by the bearing carrier 8 and the co-operating portion of the mounting base 5 so that the bearing rings 12 may be displaced laterally within the bearing chamber 4 relative to the bearing carrier 8 and mounting base 5 to a limited extent, as will be further referred to hereinafter.

The bearing carrier 8 being in threaded engagement with the base 5 at 3 as previously referred to, enables the axial length of the bearing chamber 4 to be adjusted to maintain the bearing rings 12 in the required contact with the part-spherical external surface of the bearing portion 14 of the guide member 11, so that the guide member has:

(1) limited rotational movement about the center point of the part-spherical surface 14 relative to the bearing carrier 8 and the mounting base 5, to accommodate angular misalignment between the rod 32 passing through the guide member 11 and the mounting base 5, and (2) limited lateral movement in the bearing chamber 4 to accommodate lateral misalignment between the rod 32 passing through the guide member 11 and the mounting base 5.

Figure 2:
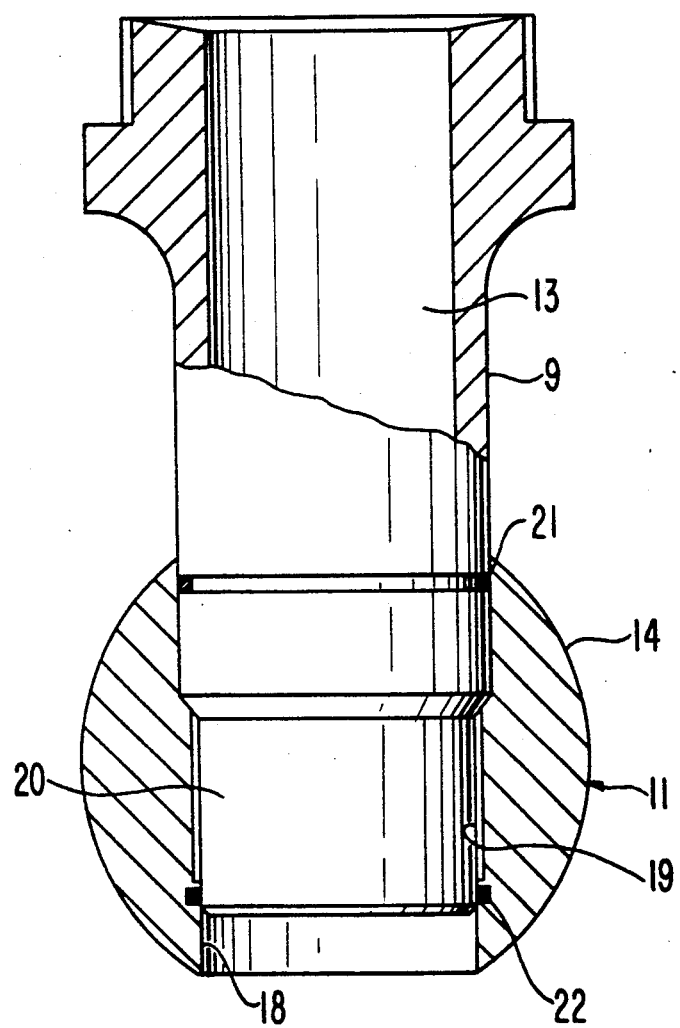
FIG. 2 is a sectional view of a stuffing box unit fitted to the guide member and being shown removed from the lower body portion of the seal device.

As can be seen in FIG. 2, the part-spherical portion 14 of the guide member 11 is separate from the tubular portion 9. The bearing portion 14 has an axial bore 18 therethrough with an internally threaded central portion 19. The tubular portion 9 has a threaded external portion 20 adjacent the lower end thereof. The externally threaded portion 20 co-operates with the internal thread 19 on the bearing portion 14 when the two components are assembled together. Respective 0-rings 21 and 22 form seals between the internal surface of the bore 18 and the external surface of the tubular portion 9.

As can be seen in FIG. 1, the tubular portion 9 extends through the somewhat oversized bore 23 in the bearing carrier 8 to accommodate angular disposition of the tubular portion with respect to the axis of the bore 6 in the mounting base 5. This angular relation is accommodated by limited rotation of the guide member 11 within the bearing rings 12.

Also as the bearing rings 12 have radial clearance 29 in the bearing chamber 4 of the bearing carrier 8, and clearance is provided by the diameter of the passage 6 in the mounting base 5, misalignment between the mounting base 5 and the reciprocating rod is accommodated. This misalignment may arise from manufacturing tolerance and/or assembly inaccuracies. The clearance of the guide member 11 in the bore 23 in the bearing carrier 8 is also sufficient to accommodate this misalignment.

As can be seen in FIG. 1 of the drawings, there is mounted on the tubular portion 9 a stuffing box unit 24, of a generally known type, where a pressure cap 30 applies pressure to packing material 31 to compress same into sealing relationship with the reciprocating rod 32 (shown in broken outline) passing through the guide member 11 and the stuffing box unit 24. A sleeve 26 of the stuffing box unit 24 threadably engages the tubular portion 9 at 27 and the pressure cap 30 threadably engages externally the sleeve 26 at 28.

The reciprocating rod 32, such as the rod of a down hole pump, which passes through the bore 13 in the guide member. 11, extends through the stuffing box unit 24 and passes outwardly therefrom through a central opening 25 in the upper end thereof. In use, conventional compressible packing material 31 is placed in the sleeve 26, about the periphery of the rod 32 passing therethrough, and the pressure cap 30 is screwed down to apply end pressure to the packing material so as to compress it into sealing engagement with the surface of the reciprocating rod. It will be readily understood that the construction and operation of the stuffing box unit is conventional and no further description thereof is required. The degree of lateral movement is dependent upon the particular area of application of the seal device and the extent of misalignment normally encountered in that area.

It will be appreciated that in down hole pumps the pump rod suspended from the pump head has an all-up weight of several tons and accordingly gravity forces act to endeavor to position the pump rod vertical. Any misalignment of the pump rod will thus develop a substantial lateral force that normally would cause rapid wearing of the packing material in the stuffing box. In the seal device of the present invention, the lateral force arising from misalignment of the pump rod will cause lateral displacement of the bearing rings 12 in the bearing chamber 4. As can be seen in FIG. 1, each bearing ring 12 includes an inner part spherical annular portion 17 which is in engagement with the external part spherical bearing surface of the bearing portion 14 displacing the guide member 11 and the stuffing box 24 simultaneously such that unwanted lateral forces are concealed within the chamber 4 and the stuffing box unit 24 permitting the pump rod 32 to have uninhibited travel along the vertical axis and thus extending the effective life of the packing material.

We claim:

1. A seal assembly for use in establishing a seal between two members one of which is a stationary member and the other of which is a reciprocating member adapted to extend through and reciprocate relative to said stationary member, said seal assembly comprising:
  a mounting base having means thereon for securing it to said stationary member, a bearing carrier engaged with the mounting base, the mounting base and the bearing carrier defining a bearing chamber,
  a passage extending through said mounting base adapted to substantially coaxially enclose said reciprocating member during relative movement thereof with respect to said stationary member,
  a guide member having an axial bore therethrough for alignment with said passage and through which said reciprocating member is adapted to extend, said guide member having a bearing portion at one axial end and a stuffing box unit at the other axial end thereof, said stuffing box unit being arranged to receive packing material to form a seal with said reciprocating member,
  said bearing portion being located in said bearing chamber said bearing carrier having an oversize bore at an end thereof remote from said mounting base, and said guide member extending through said oversize bore,
  bearing means located in said bearing chamber and engaging said bearing portion of said guide member, said bearing means permitting angular axial displacement of said guide member with respect to said mounting base and bearing carrier, and
  said bearing means being mounted for transverse movement with respect to said mounting base and bearing carrier, whereby said stuffing box unit can self-align with said reciprocating member.

2. A seal assembly as claimed in claim 1, wherein said bearing means comprises two bearing elements mounted in said bearing chamber in space relation in the axial direction of said passage, each said bearing element having independent transverse movement in said bearing chamber relative to said mounting base and bearing carrier.

3. A seal assembly as claimed in claim 2, wherein said bearing portion of said guide member has an external, part-spherical surface, said bearing means operatively engaging said part-spherical surface at least two locations on opposite sides of a diametral plane of said part-spherical surface.

4. A seal assembly as claimed in claim 3, wherein said bearing elements are each of annular form and respectively engage the external part-spherical surface on opposite sides of said diametral plane.

5. A bearing assembly as claimed in claim 3, wherein an 0-ring seal is provided between one of said bearing elements and the guide member and the mounting base, and an 0-ring seal is provided between the other of said bearing elements and the guide member and the bearing carrier.

* * * * *